US008728651B2

(12) United States Patent
Brilmyer (10) Patent No.: US 8,728,651 B2
(45) Date of Patent: May 20, 2014

(54) LOW ASPECT RATIO SPIRAL-WOUND VRLA BATTERY

(75) Inventor: George H. Brilmyer, Johnson City, TN (US)

(73) Assignee: Highwater Innovations, LLC, Johnson City, TN (US)

(*) Notice: Subject to any disclaimer, the term of this patent is extended or adjusted under 35 U.S.C. 154(b) by 296 days.

(21) Appl. No.: 13/038,758

(22) Filed: Mar. 2, 2011

(65) Prior Publication Data

US 2012/0052352 A1 Mar. 1, 2012

Related U.S. Application Data

(60) Provisional application No. 61/378,055, filed on Aug. 30, 2010.

(51) Int. Cl.
*H01M 2/02* (2006.01)
*H01M 10/12* (2006.01)
*H01M 10/50* (2006.01)
*H01M 10/0587* (2010.01)
*H01M 10/06* (2006.01)
*H01M 2/20* (2006.01)
*H01M 2/28* (2006.01)
*H01M 2/10* (2006.01)
*H01M 10/04* (2006.01)

(52) U.S. Cl.
CPC .......... *H01M 10/121* (2013.01); *H01M 10/125* (2013.01); *H01M 10/503* (2013.01); *H01M 10/0587* (2013.01); *H01M 10/06* (2013.01); *H01M 2/202* (2013.01); *H01M 2/28* (2013.01); *H01M 10/5004* (2013.01); *H01M 10/5016* (2013.01); *H01M 2/204* (2013.01); *H01M 2/1077* (2013.01); *H01M 2/0245* (2013.01); *H01M 10/0431* (2013.01); *Y02T 10/7016* (2013.01); *Y02E 60/126* (2013.01)
USPC ............. 429/164; 429/94; 429/121; 429/122; 429/123; 429/128; 429/133; 429/149; 429/151; 429/154; 429/157; 429/158; 429/160; 429/161

(58) Field of Classification Search
CPC ............ H01M 10/121; H01M 10/125; H01M 10/5004; H01M 10/5016; H01M 10/503; H01M 10/5061; H01M 2/28; H01M 2/202; H01M 2/1077; H01M 2/0245; H01M 2/204; H01M 10/0587; H01M 10/06; H01M 10/0431; Y02E 60/126; Y02E 10/7016
USPC ............... 429/94, 97, 99, 121–123, 128, 133, 429/140, 149, 151, 154, 157, 158, 161, 163, 429/164, 167, 170, 178, 160
See application file for complete search history.

(56) References Cited

U.S. PATENT DOCUMENTS 4,262,064 A * 4/1981 Nagle ............................ 429/94
4,352,867 A 10/1982 Catanzarite
(Continued)

FOREIGN PATENT DOCUMENTS

EP 1225651 B1 3/2005
WO 0008704 A1 2/2000

*Primary Examiner* — Patrick Ryan
*Assistant Examiner* — Ben Lewis
(74) *Attorney, Agent, or Firm* — Luedeka Neely Group, P.C.

(57) ABSTRACT

A valve regulated lead-acid (VRLA) battery having a plurality of stacked, interconnected spiral-wound cells. Each cell has a length (L) less than a diameter (D) and each cell has a non-conductive case containing spiral-wound positive and negative plates, a separator between the plates, an acidic electrolyte, and a positive post and a negative post disposed through the case for electrical connection to an adjacent cell in series.

20 Claims, 6 Drawing Sheets

(56) References Cited

U.S. PATENT DOCUMENTS

| | | | |
|---|---|---|---|
| 5,422,196 A * | 6/1995 | Klein | 429/402 |
| 5,501,916 A | 3/1996 | Teramoto et al. | |
| 5,830,599 A * | 11/1998 | Okamoto et al. | 429/163 |
| 6,265,091 B1 | 7/2001 | Pierson et al. | |
| 6,265,098 B1 * | 7/2001 | Audit et al. | 429/94 |
| 6,479,185 B1 | 11/2002 | Hilderbrand et al. | |
| 6,726,733 B2 | 4/2004 | Lee et al. | |
| 6,881,514 B2 | 4/2005 | Ahn et al. | |
| 7,087,345 B2 | 8/2006 | Matsumoto et al. | |
| 2002/0038765 A1 * | 4/2002 | Fitter | 205/302 |
| 2003/0044683 A1 | 3/2003 | Zguris et al. | |
| 2003/0054232 A1 | 3/2003 | Zucker | |
| 2003/0232238 A1 * | 12/2003 | Fleming et al. | 429/94 |
| 2004/0091777 A1 * | 5/2004 | Lam et al. | 429/225 |
| 2007/0037053 A1 * | 2/2007 | Anantharaman | 429/176 |
| 2007/0160910 A1 * | 7/2007 | Sugie et al. | 429/245 |
| 2008/0050656 A1 | 2/2008 | Eisenbeiser | |
| 2009/0269666 A1 | 10/2009 | Lara-Curzio et al. | |
| 2010/0025132 A1 | 2/2010 | Hill et al. | |
| 2010/0175934 A1 | 7/2010 | Lam et al. | |

* cited by examiner

LOW ASPECT RATIO SPIRAL-WOUND VRLA BATTERY

TECHNICAL FIELD

The disclosure relates to automotive batteries and in particular to valve-regulated lead-acid (VRLA) batteries and to construction techniques for improving cell and battery performance.

BACKGROUND AND SUMMARY

The automotive industry is in need of a battery technology that affords high voltage, high power, low cost, long life and recyclability for a growing number applications such as in hybrid electrical vehicles (HEV). Valve-regulated lead-acid (VRLA) battery technology may meet or exceed many of the requirements for low cost, sufficient power, and recyclability and very recently has been demonstrated to meet the life requirements in terms of high rate partial state of charge cycling. Despite these positive attributes, improvements in VRLA technology may be required to improve energy density, form, function, fitment and thermal management, particularly for use in hybrid electric vehicles.

One type of VRLA battery technology that may be used is spiral-wound cell technology. Spiral-wound VRLA cells are typically more compact than conventional lead-acid batteries and offer very high power and extended cycle life. Such cells typically include spaced-apart positive and negative plates having a grid-like construction.

The elongated grid structure for a spiral-wound VRLA battery is filled with the active materials to form either positive or negative plates. Sandwiched between the positive and negative plates is a thin porous absorptive glass matte (AGM) separator. The plates-separator assembly is wound into a compact rugged cylindrical form with the positive and negative plates and separator between the plates. The separator electrically isolates the plates from each other, and also functions as an effective wick or absorbent to retain the cell's electrolyte (an aqueous solution of sulfuric acid) between the plates and keep it evenly distributed in the working area of the cell. The thin, highly porous separator also keeps the ionic path between the positive and negative plates short and permits rapid diffusion of electrolyte. Thus the closely spaced construction of the plates and separator all contribute to the cell's ability to be discharged at high rates.

The typical spiral wound VRLA cell also generally includes a predetermined ratio of positive to negative active material that is sufficient to optimize battery life and performance while minimizing the formation of gases in the cell. A resealable vent is provided for the VRLA cell for releasing internal pressure in the cell should excess or undesirable gases be generated.

One disadvantage of conventional spiral-wound VRLA batteries made of multiple VRLA cells is the space requirements for obtaining batteries with the desired voltage. The VRLA batteries are comprised of cells that typically have a high aspect ratio of length (L) to diameter (D) wherein L>D. Such VRLA cells tend to be positioned side by side and then connected in series with small wires and electrical clips to attain the required battery or system voltages.

Larger spiral-wound VRLA single cells (>5 Ah) and multi-cell batteries are produced for UPS applications and are sold in custom cell sizes resembling a juice can or can of soup. Single cells are used in 3, 6, or larger groups and positioned and electrically connected side-by-side in a similar manner to the smaller cells. When produced as multi-cell mono-block batteries, these mono-block batteries tend to be 2, 3 or 4 cell packages with cells positioned side-by-side. The cell-to-cell connections in these mono-block batteries are made internally in an attempt to minimize the battery "foot-print," i.e., the planar space requirement for the battery.

Spiral-wound VRLA technology has also been introduced to the automotive battery industry for starting, lighting, and ignition (SLI) applications. Such batteries resemble a "6-pack" of beer or soda and may have suitable cranking power, long life, and adequate performance in automotive or marine applications. As with the smaller spiral-wound VRLA batteries described above, the spiral-wound SLI batteries use high aspect ratio cells. Despite the fact that these batteries may be constructed in a custom six-cavity container shape with cast-on-terminal inter-cell connections, these batteries are not typically compact and may not readily interconnected with one another for high voltage HEV applications.

Despite the varied application and design, conventional spiral-wound VRLA cells all have the same common feature related to their shape, that is, all spiral-wound VRLA batteries have a high aspect ratio wherein L>D. Accordingly, the conventional VRLA batteries tend to function better if placed side-by-side rather than stacked on top of each other. Electrical terminals for the VRLA batteries tend to protrude from the top of the cells thereby further limiting the ability to stack the high aspect ratio cells. High aspect ratio batteries also have tall grids in the L direction that may result in higher resistivity and more voltage losses in applications that require high power such as HEV. Attempts have been made to improve the high rate performance of these cells by using multiple internal tabs; however such attempts have had only limited success. It has been difficult to assemble relatively high voltage batteries (~200 v), such as those required for HEV applications, from conventional VRLA cells or modules due to the need for wiring and lengthy intercell connections. There is therefore a need for a VRLA cell design for high voltage applications that has the ability to take full advantage of the spiral-wound cell technology.

In view of the foregoing and other needs, an embodiment of the disclosure provides a valve regulated lead-acid (VRLA) battery having a plurality of stacked, interconnected spiral-wound cells. Each cell has a length (L) less than a diameter (D) and each cell has a non-conductive case containing spiral-wound positive and negative plates, a separator between the plates, an acidic electrolyte, and a positive post and a negative post disposed through the case for electrical connection to an adjacent cell in series.

Another embodiment of the disclosure provides a valve-regulated lead-acid (VRLA) energy storage cell for a battery. The energy storage cell has a non-conductive case, spiral wound positive and negative plates and separator between the plates disposed in the case. A liquid electrolyte for energy transfer is disposed between the plates. The positive and negative plates have multiple tabs. A positive strap and post are connected to the positive tabs and a negative strap and post are attached to the negative tabs. The positive and negative posts are disposed through the non-conductive cover of the case. Terminals are attached to the exposed post ends to serve as inter-cell connections. The energy storage cell has a length (L) that is less than a diameter (D).

An advantage of the foregoing VRLA cell and battery is that stacking the cells may be possible by the nature of the low aspect ratio (L<D) of the cells. Accordingly, multiple cells may be interconnected with less space than with conventional spiral wound VRLA cells.

A secondary advantage of the spiral-wound cell having a low aspect ratio, i.e., L<D, is that cells having shorter grids in the L direction and thus may exhibit improved cell performance due to lower electrical resistance from one end of the cell to the opposite end of the cell. Also, by having the diameter greater than the length of the cells, more tabs may be used across the diameter of the cell thereby further reducing cell resistance values for cell interconnection. Cells having a larger diameter than height may provide more stable stacking arrangements due to a larger area for stacking the cells end to end.

For relatively large diameter spiral-wound VRLA cells, cells having a toroidal or open core design may provide for more uniform cooling of the cells using a variety of cooling mediums such as air, water, and heat transfer fluids. By contrast, conventional SLI batteries are prismatic by design and thus offer very little possibility for uniform cell cooling.

BRIEF DESCRIPTION OF THE DRAWINGS

Further benefits and advantages of the disclosed embodiments may be evident from the following detailed description of exemplary embodiments in conjunction with the attached drawings, wherein like numerals represent like features.

DESCRIPTION OF THE EXEMPLARY EMBODIMENTS

Figure 1:
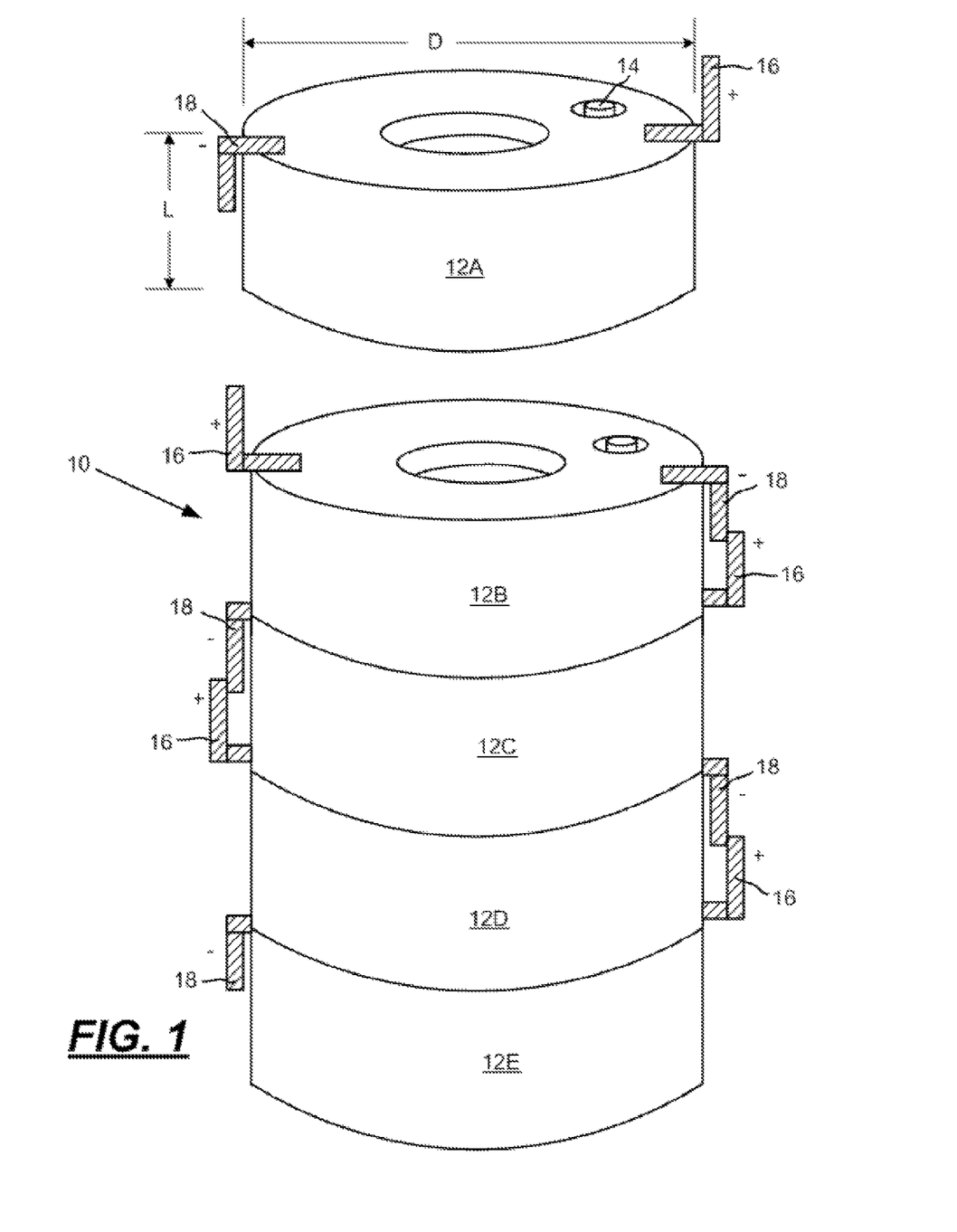
FIG. 1 is a somewhat schematic perspective view, not to scale, of a stack of low aspect ratio spiral-wound VRLA cells according to an embodiment of the disclosure.

In order to illustrate features of the disclosed embodiments, reference is now made to FIG. 1, wherein there is illustrated a stack 10 of valve regulated lead-acid (VRLA) energy cells 12A-12E. Each energy cell 12A-12E has a positive terminal 16 and a negative terminal 18 for interconnection with an adjacent energy cell. For example, energy cell 12B is interconnected in series with cell 12C and cell 12A. Likewise cell 12C is interconnected in series with cell 12D and cell 12B. Cell 12 D is interconnected with cell 12E. Since each cell 12A-12E is similar, a detailed description of cell 12A applies to each of the other cells 12B-12E in the stack 10. Energy cell 12A has a resealable relief valve 14 for releasing unwanted or undesirable gases from the cell to the atmosphere.

An important feature of the VRLA cell 12A according to the disclosure is that the length (L) of each cell 12A is less than the diameter (D) of each cell, thereby providing cells 12A with what will be referred to herein as a "low aspect ratio." The low aspect ratio VRLA energy cell 12A is designed for efficient stacking to provide high voltage operation and maximum power with a reduced size and weight. Accordingly, the L/D ratio of the cell 12A may be about 0.99, which is the upper limit for cell performance benefits as described herein. The smallest practical L/D ratio for cell 12A is suitably about 0.08 which is limited by an ability to wind a coil of plates and separator while maintaining lap to lap stability. L/D ratios ranging from about 0.8 to about 0.1, or from about 0.6 to about 0.4 may also be desirable.

Figure 2:
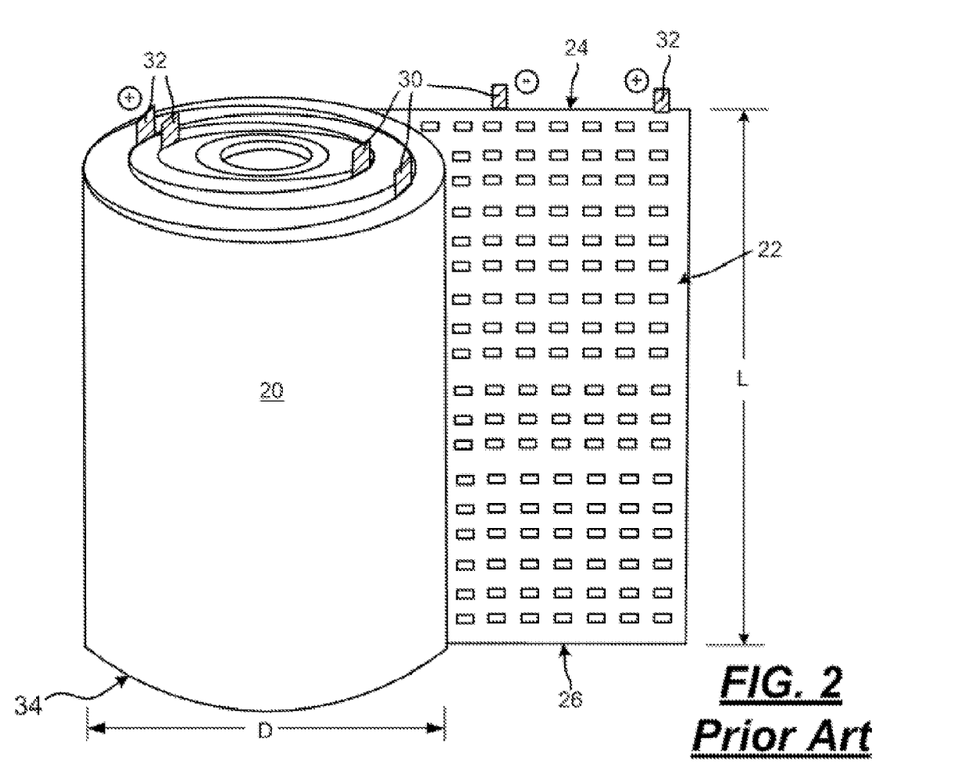
FIG. 2 is a perspective view, not to scale, of construction features of a conventional spiral-wound VRLA cell.
Figure 3:
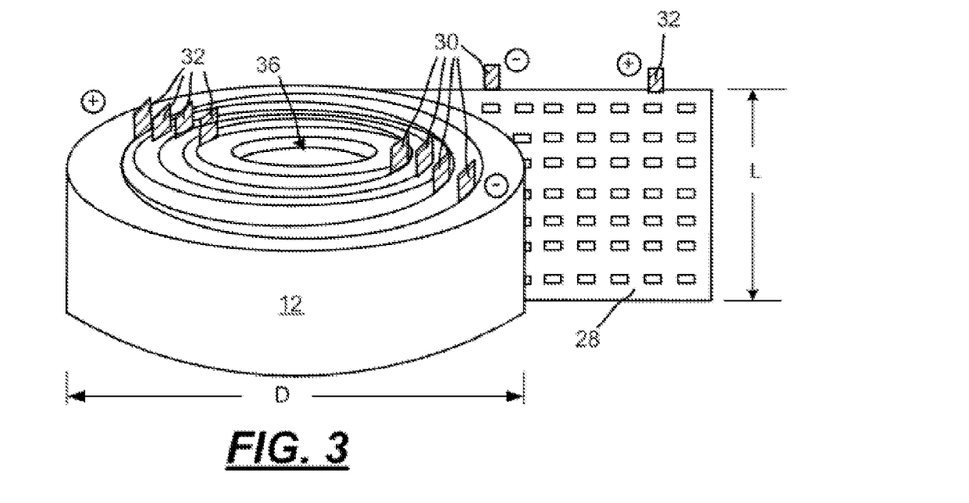
FIG. 3 is a perspective view, not to scale, of construction features of a low aspect ratio spiral-wound VRLA cell according to the disclosure.

Lower aspect ratio cells 12A may provide an added benefit of having shorter grid plates in the L direction, which have lower electrical resistance in the L direction (i.e., from one end of the grid to a distal end of the grid). For comparison purposes, a conventional VRLA cell 20 is shown in FIG. 2. Cell 20 has an L/D ratio of greater than 1, that is, L is greater than D. Accordingly, the grid plates 22 of the conventional VRLA cell 20 have a length L from one end 24 to a distal end 26 that is relatively long compared to the length L of the grid plates 28 of the VRLA cell 12 according to the disclosure as shown in FIG. 3. Because of the larger diameter than length of the low aspect ratio VRLA cell 12, a cell designer must include more tabs 30 and 32 than may be included on the conventional VRLA cell 20 as shown in FIG. 2. More tabs 30 and 32 will further act to improve cell performance through lower electrical resistance. As shown in FIG. 3, the tabs 30 and 32 are all on the same side of the grid plates 28.

As set forth above, the concept of cell stacking is also better adapted to low aspect ratio cells 12. The conventional high aspect ratio cells 20, such as those manufactured for the UPS and SLI industries, typically have too great a length L to facilitate compact high voltage stacking or efficient interconnectivity and may not provide a substantially stable base 34 for stacking cell to cell. A stackable low aspect ratio VRLA cell 12A, according to the disclosure, may provide a compact, stable, interlocked cell-to-cell stack 10 as shown in FIG. 1.

Each of the VRLA energy cells 12 according to the disclosure is desirably a spiral-wound cell 12. By "spiral-wound" is meant that the positive plate, negative plate, and separator(s) between the plates 28 are wound in a spiral about a central core 36. The plates 28 may be made of a variety of materials including pure lead, lead-tin alloy, lead-tin-calcium alloy, copper and the like.

Figures 4, 9:
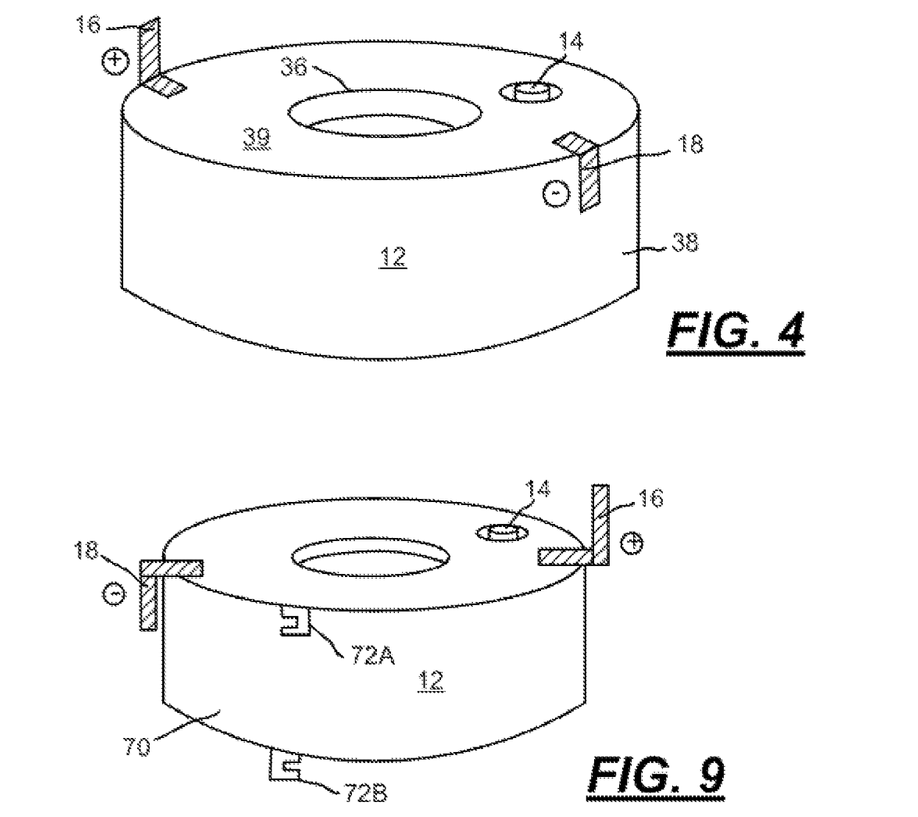
FIG. 4 is a perspective view, not to scale, of a low aspect ratio spiral-wound VRLA cell according to the disclosure.
FIG. 9 is a perspective view, not to scale, of VRLA cells having interlocking devices for stacking spiral-wound VRLA cells according to an embodiment of the disclosure.
Figure 5A:
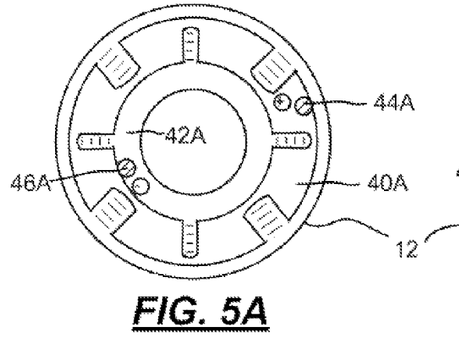
FIGS. 5A-5F are plan views, not to scale, of various strap and post configurations for VRLA cells according to the disclosure.
Figure 5B:
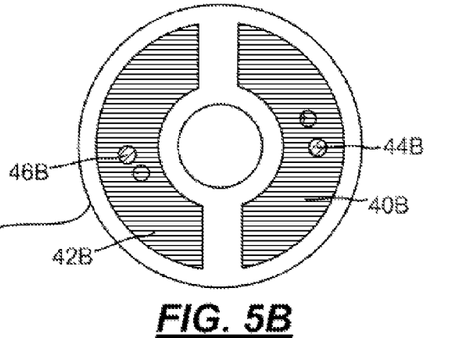
Figure 5C:
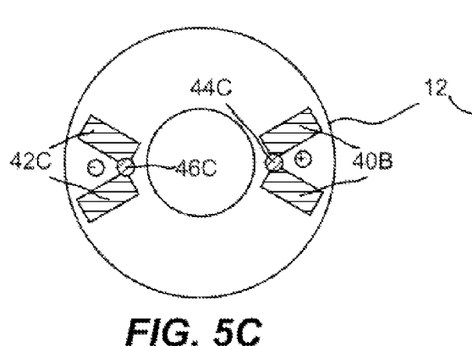
Figure 5D:
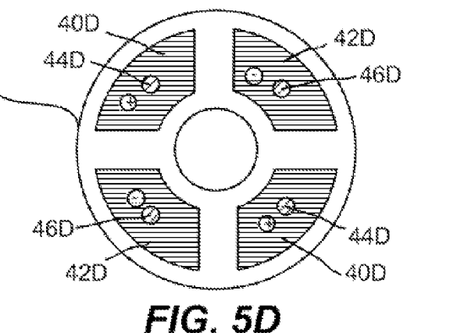
Figure 5E:
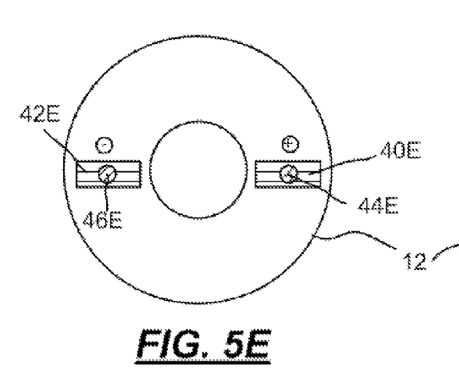
Figure 5F:
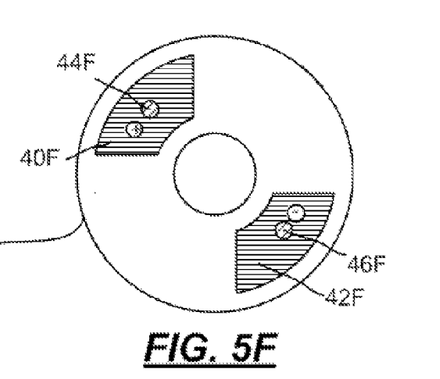

With reference to FIG. 4, further details of a spiral-wound VRLA energy cell 12 are illustrated. The VRLA cells 12 include a non-conductive outer shell 38 with the positive terminal 16 and the negative terminal 18 disposed on the shell 38 for interconnection with an adjacent cell 12. The spiral-wound plates and separator(s) may be wound around a relatively large central core 36. The central core 36 may be open or closed. Whether open or closed, the relatively large central core 36 has an added benefit of providing a more stable structure for spiral winding, thus producing more uniform plate-to-separator contact and compression throughout the cell. An open core 36 may be used for cooling. The core is an opening through the cover 39 thereby providing the cell 12 with a toroidal shape as shown in FIG. 4.

Metal cases that may be crimped with a gasket to seal the plates, separators, and electrolyte within a conductive shell are particularly avoided by the VRLA energy cells 12 according to the disclosure. For example, a toroidal (donut-shaped) alkaline cell and battery may use two metal conductive donut-shaped case halves that are fitted together with two gaskets in electrical isolation to form the cell. However, the case halves must also be crimped and sealed around the circumference of the central hole. The double crimp seals (one on the OD and one on the ID) may be costly and difficult to implement in a manufacturing environment thereby inhibiting the commercialization of such a cell design.

Such cells are similar in design to a button or coin cell whereby the entire top surface of the battery cell is the metal electrode terminal of the positive electrode and the entire bottom surface of the cell is the metal electrode terminal of the negative electrode. Inter-cell connectivity of such cells to provide a battery of cells is facilitated by the fact that the case halves are metal and the top and bottom are opposite polarity. However, such metal on metal case design is not readily adapted to lead-acid battery chemistry, which is not compatible with metal case materials.

Similarly, Li-ion cells may be designed with through holes to facilitate cooling due to the nature of the use of a low conductivity electrolyte that tends to run at temperatures that require cooling. In one prior art Li-ion cell, a 5-part crimped metal structure is used to ensure functional battery design and performance of the battery.

Unlike button type energy cells and Li-ion cells that use a non-aqueous and sometimes gelled electrolyte, conductive shells, covers and gaskets are not an option in a VRLA cell 12 due to the highly corrosive acid environment of the cell 12. Hence, VRLA cells 12 according to the disclosure desirably employ a polymeric outer shell 38 and a polymeric cover 39 to provide a non-conductive case. Such a polymeric battery case may eliminate the need for donut-shaped half-cases and the need for difficult crimping and gasket technology used for conventional button type or Li-ion energy cells using metal or conductive cases.

Accordingly, a low aspect ratio polymeric VRLA cell 12 according to the disclosure may feature an injection-molded polymeric material for providing the shell 38 and cover 39 sealed to the shell. The shell 38 and cover 39 may be made from a variety of polymeric materials, such as polypropylene, high density polyethylene, low density polyethylene, and acrylonitrile/butadiene/styrene (ABS) and the like, that may withstand operating elevated operating temperatures during use or recharging. As set forth above, an advantage of using a non-conductive case is that the cell 12 may use a corrosive electrolyte material within the case.

Use of polymeric materials also enables the cover 39 to be designed with a central core or central opening 36 without loss of the ability to effectively seal the shell 38 to the cover 39 to prevent electrolyte leakage. The central core or opening 36 may provide a toroidal-shaped case (resembling a "bunt" cake pan) with a generally flat or planar, heat-sealable cover 39 with the core or opening 36 in the center thereof for sealing the cover to the shell 38 containing the spiral wound plates and separator(s). In order to provide a battery of cells 12, each set of positive and negative grid plates 28 may be interconnected to one another by use of internal straps connected to the tabs 30 and 32. The straps may be connected to protruding metallic posts that may be configured with metallic terminals to facilitate cell stacking. In an alternative embodiment, the plates and separator may be wound onto a polymeric spool and a polymeric hoop may be heat-sealed around the spool to provide the case. The foregoing assembly may resemble that of a spool package of pipe joint sealing tape. Ultrasonic welding adhesives may be used for sealing the cover to the shell for case materials that are not adaptable to heat sealing techniques.

FIGS. 5A-5F provide an illustration of various strap configurations that may be used inside the cell for interconnecting the positive tabs 30 and negative tabs 32 of VRLA cells 12 according to the disclosure. These straps may be affixed via a state of the art COS (cast-on-strap) machine or by the manual method of "hand-burning". In each configuration the positive strap(s) 40 are spaced apart from and do not come in contact with the negative strap(s) 42. An insulating sheet of plastic or other non-conductive material that is resistant to the electrolyte may be placed between each strap and the top of the opposing plates to ensure that the strap does not come in contact with the tops of the opposing plates. The positive straps 40 and negative straps 42 also serve to interconnect the positive and negative tabs to the positive and negative posts 44 and 46, respectively, that pass though the cover 39 of the cells 12. The positive terminals 16 and negative terminals 18 are then soldered or crimped to the top of each post 44 and 46, respectively, after the cover 39 has been sealed in place.

Figure 6A:
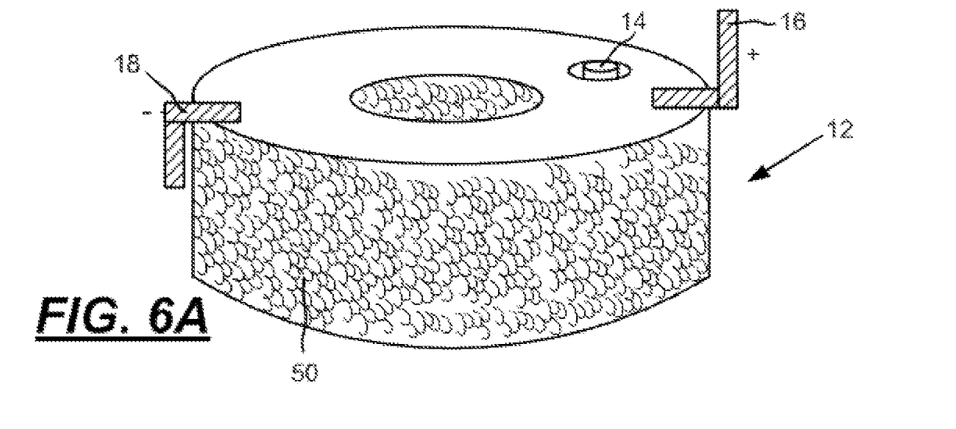
FIGS. 6A-6C are perspective views, not to scale, of shell surface cooling features for VRLA cells according to the disclosure.
Figure 6B:
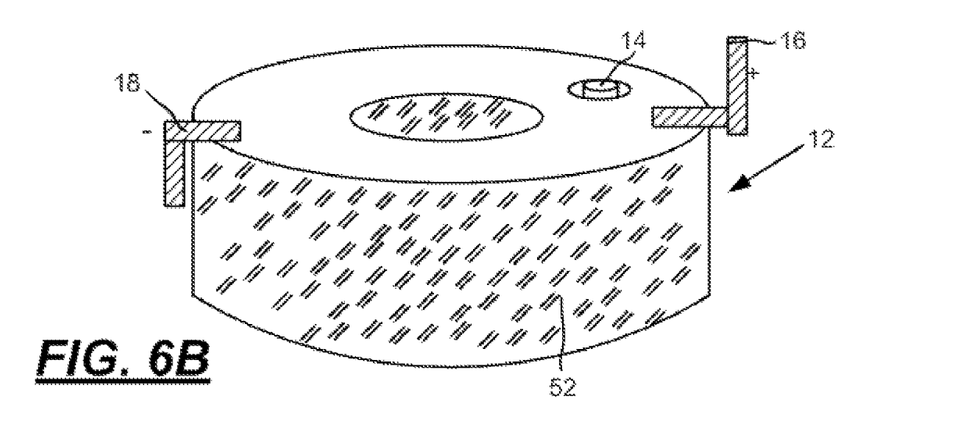
Figure 6C:
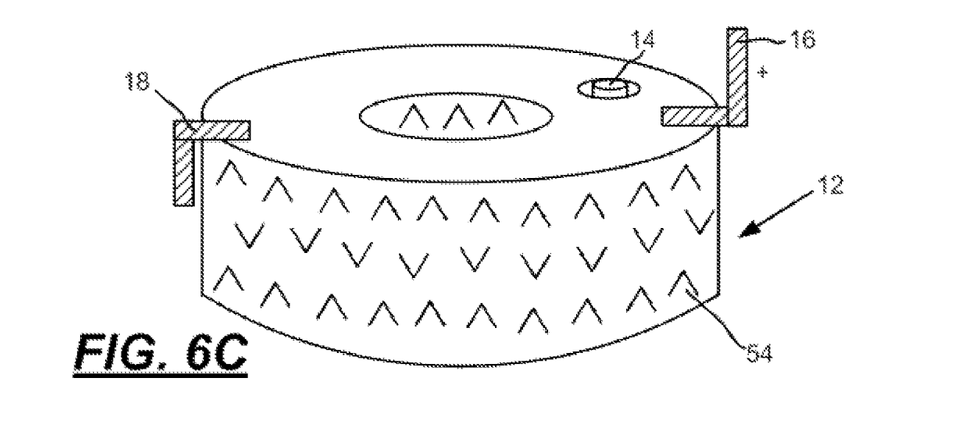

With reference to FIG. 6A-6C, polymeric materials used for the VRLA cells 12 may enable use of surface texturing of the shell 38 to further facilitate cooling of the cells 12 with air or cooling fluids. The surface texturing may resemble scales 50 (FIG. 6A), striations 52 (FIG. 6B) or fins 54 (FIG. 6C) or any other surface relief or indentations that may enhance cooling of the cell 12.

Figure 7:
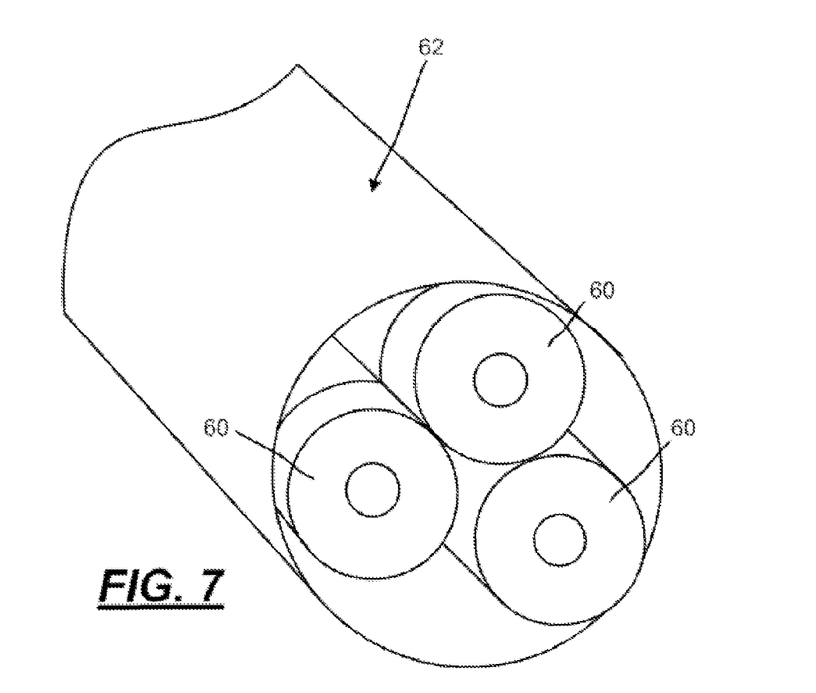
FIG. 7 is a perspective view, not to scale, of a tubular battery containing an array of stacked, low aspect ratio spiral-wound VRLA cells according to an embodiment of the disclosure.
Figure 8:
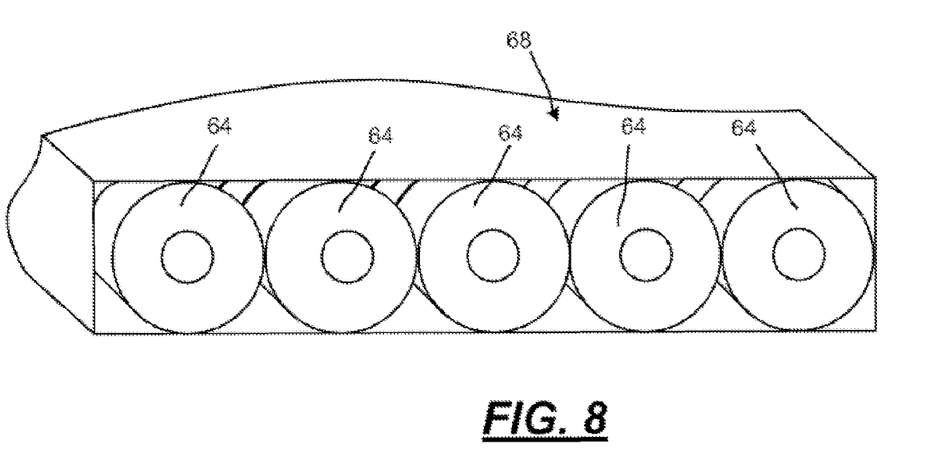
FIG. 8 is a perspective view, not to scale, of a rectangular battery containing an array of stacked low aspect spiral-wound VRLA cells according to an embodiment of the disclosure.

As described above, inter-cell terminal connections may be made in several ways on the outside circumference of the low aspect ratio VRLA energy cell 12 as shown in FIG. 1 or between the outside circumference and inner core 36 of the VRLA cell 12. In this way, for example, a high voltage HEV battery pack (~100 volts) might be comprised of several low aspect ratio batteries 60 made of a stacked cells 10 arranged horizontally, side-by-side in a cooling tube 62 as shown in FIG. 7 or batteries 64 may be arranged horizontally, side-by-side in a cooling box 68 as shown in FIG. 8. The tube arrangement 62 or box arrangement 68 may be selected depending on the application and required fitment (for example; under the vehicle hood or below the floor-board of the vehicle's passenger compartment). With multiple arrangement options available due to the use of stackable VRLA energy cells 12, air, water or cooling media may be circulated around and through each low aspect ratio VRLA battery for optimum performance. The use of water or other cooling media may require the addition of fluid tubes or ducts to the cooling tube 62 or box 68.

Another feature of the energy cells 12 according to the disclosure is that the cells 12 may designed with interlocking cases 70 (FIG. 9) and opposed terminals 16 and 18 or 40 and 42 (as shown in FIGS. 5A-5E). The interlocking cases 70 may include a tab locking element 72A that may be interlocked with a tab locking element 72B for secure connection of the opposed electrodes 16 and 18 (or electrodes illustrated in FIGS. 5A-5F). Other types of interlocking devices or features may be molded into or attached to the cases 70 for secure stacking of the VRLA energy cells 12.

As set forth above the open central core 36 of the toroidal case design 38 (FIG. 4) may be used for improved thermal management for HEV use. In an HEV application, for example, the cells 12 may be stacked to form a 48-volt battery module. The 48-volt battery modules may be further stacked, racked, aligned, or positioned, side by side, in a horizontal or vertical arrangement. The entire stacked arrangement may be easily cooled and thermally managed by pumping air or other cooling media, such as water, or a heat transfer fluid through and around the stacks and modules. Enhanced cooling of the battery stacks 10 may be achieved by use of one or more of the shell designs shown in FIGS. 6A-6C.

Further features of the disclosed embodiments may be evident from the following non-limiting examples.

Example 1

A low aspect ratio spiral-wound VRLA battery is constructed by first preparing positive grids cast from a conventional lead-tin-calcium alloy and negative grid plates cast from a lead-calcium alloy. In this example both grid plates have a width of 2.54 cm and a length of 100 cm thus having a geometric area of approximately 254 cm$^2$ per side. The positive grid has a thickness of 1.2 mm while the negative grid is 1.0 mm thick. The positive plate is pasted to a thickness of 1.4 mm using a conventional litharge based oxide containing 24 wt. % red lead. The negative grid is pasted with a conventional leady oxide paste to a thickness of 1.2 mm using a paste mix that includes a conventional negative expander mixture and state of the art graphite (2 wt. %) and activated carbon (2 wt. %) additives for improved high rate partial state of charge cycling. Immediately after pasting the positive and negative "plates," the plates are wound around a 4 mm mandrel while interleaving the plates with an absorbent glass matte battery separator (1.3 mm thick) between the plates. The winding tension is controlled so as to compress the separator to a thickness of 1.0 mm in the wound cell. The finished spiral-wound "cell" has an outer diameter of approximately 7.0 cm. The wound cell is immediately placed into a drying oven at 80° C. for 24 hours. The fully dried cell is then fitted with cast-on-straps and posts, and the spiral wound structure is inserted and sealed into an injection-molded cylindrical polypropylene case.

As described above, each of the positive and negative grids have tabs for electrical connection to corresponding positive and negative straps. Once the plates and separators are wound up to form the cell, the straps are cast (molten lead) onto the tabs to gather all the positive tabs together and all of the negative tabs together. Each of the positive and negative straps have a post that is designed to protrude slightly through the cover of the case. After the cover is heat-sealed in place to the case, post seals are made with the cover and then tin plated copper positive and negative terminals are soldered onto the posts to provide inter-cell connection terminals. Acid is then injected into the cell and an initial formation current is applied. The formation process requires approximately 48 hours after which the cell is finished and ready for testing and operation. The aspect ratio of the cell is approximately 0.4.

Example 2

A low aspect ratio spiral-wound VRLA battery with a central core for cooling is constructed by first preparing both positive and negative grids cast from a lead-tin-calcium alloy. In this example both grids have a width of 2.54 cm and a length of 153 cm thus having a geometric area of approximately 390 cm$^2$ per side. The positive grid has a thickness of 1.2 mm while the negative grid is 1.0 mm thick. The positive plate is pasted to a thickness of 1.4 mm using a conventional litharge based oxide containing 24 wt. % red lead. The negative grid is pasted to a thickness of 1.2 mm using a conventional leady oxide/expander paste mix without the graphite and activated carbon additives used in Example 1. Immediately after pasting the positive and negative "plates," the plates are wound around a 25.4 mm mandrel while interleaving the plates with an absorbent glass matte battery separator (1.3 mm thick) and a sheet (0.5 cm×153 cm) of carbon paper (0.005 mm thick). The finished low aspect ratio spiral-wound "cell" has an outer diameter of approximately 8.9 cm. The finished cell is immediately placed into a drying oven at 80° C. for 24 hours. The fully dried cell is then fitted with cast-on-straps and posts, and the spiral wound structure is inserted and sealed into an injection-molded cylindrical polyethylene case having an open central core. The polyethylene case also features "orange peel" texturing similar to the surface of an orange on both external vertical surfaces thereof. The cell is designed with dual positive and dual negative straps 40D and 42D per FIG. 5D.

As described above, each of the positive and negative grids have tabs for electrical connection to corresponding positive and negative straps. Once the plates and separators are wound up to form the cell, the straps are cast (molten lead) onto the tabs to gather all the positive tabs together and all of the negative tabs together. Each of the positive and negative straps have a post that is designed to protrude slightly through the cover of the case. After the cover is heat-sealed in place to the case, post seals are made with the cover and then tin plated copper positive and negative terminals are soldered onto the posts to provide inter-cell connection terminals. As in Example 1, acid is injected into the cell and the initial formation current applied. The formation process requires approximately 48 hours and the cell is finished and ready for testing and operation. The aspect ratio of the cell is approximately 0.3.

It will be appreciated by those skilled in the art, that the low aspect ratio cell design has an increased propensity to supply a high power output. The associated low aspect ratio (short) grids may significantly reduce resistance losses in the cell and when combined with improved tab and strap designs such as shown in FIG. 3 and FIGS. 5A-5F, the cells may have a further increase in power for HEV applications.

An ability to more effectively cool the batteries made with low aspect ratio VRLA cells 12 is another important feature of the disclosed embodiments. One problem encountered in the HEV application is the need to remove large amounts of heat that tends to be generated by the high rate partial state of charge cycling of conventional SLI and VRLA batteries. Conventional SLI batteries are prismatic by design and offer very little possibility for uniform cell cooling. The two end cells of a conventional SLI battery always run cooler than the center cells simply because they have more exposed surface area than the inner four cells. Spiral-wound SLI batteries also afford little improvement in cooling as these 6-cell monoblocks are densely packed. Attempts have been made to design cooling channels within both prismatic and spiral-wound batteries but such attempts may not be technically effective or commercially viable. It is much easier to cool single cells than a battery of cells. However, the disclosed embodiments enhance the cooling of such batteries.

As used throughout the specification and claims, "a" and/or "an" may refer to one or more than one. Unless otherwise indicated, all numbers expressing quantities of ingredients, properties such as molecular weight, percent, ratio, reaction conditions, and so forth used in the specification and claims are to be understood as being modified in all instances by the term "about." Accordingly, unless indicated to the contrary, the numerical parameters set forth in the specification and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Other embodiments of the present disclosure will be apparent to those skilled in the art from consideration of the specification and practice of the embodiments disclosed herein. Accordingly, the embodiments are not intended to be limited to the specific exemplifications set forth hereinabove. Rather, the foregoing embodiments are within the spirit and scope of the appended claims, including the equivalents thereof available as a matter of law.

What is claimed is:

1. A valve regulated lead-acid (VRLA) battery comprising a plurality of interconnected spiral-wound cells, each cell having a non-conductive case containing a spiral-wound positive grid plate, a spiral-wound negative grid plate, each of the positive and negative plates having a first edge and a second edge on a side opposite the first edge and parallel with a spiral winding direction wherein each of a plurality of tabs is connected to only the first edge of the positive and negative grid plates, a spiral-wound separator between the plates, the positive and negative grid plates and the separator having a length (L) less than a diameter (D) such that the L/D ratio ranges from about 0.1 to less than about 0.8, an acidic electrolyte, and a positive post and a negative post disposed through the case for electrical connection to an adjacent cell in series.

2. The VRLA battery of claim 1, wherein each cell has a toroidal configuration with an open core for cooling and thermal management of the battery.

3. The VRLA battery of claim 1, wherein each cell has offset and oppositely opposed electrical terminals for serial cell-to-cell connection.

4. The VRLA battery of claim 1, wherein the plurality of tabs comprises eight or more tabs for each of the positive grid plate and negative grid plate.

5. The VRLA battery of claim 1, wherein the case for each cell comprises a thermoplastic molded material.

6. The VRLA battery of claim 5, wherein the case for each cell further comprises an interlocking feature for interlocking a cell with an adjacent cell in serial electrical connection therewith.

7. The VRLA battery of claim 6, wherein the interlocking feature enables the cells to be stacked in serial electrical connection.

8. The VRLA battery of claim 6, wherein the interlocking feature enables the cells to be positioned side-by-side in serial electrical connection.

9. The VRLA energy storage cell of claim 6, wherein the case further comprises an interlocking feature for interlocking a cell with an adjacent cell in serial electrical connection therewith.

10. The VRLA battery of claim 1, wherein each cell comprises a positive grid selected from the group consisting of a pure lead spiral-wound grid plate, a lead-tin spiral-wound grid plate, and a lead-tin-calcium spiral-wound grid.

11. The VRLA battery of claim 1, wherein each cell comprises a copper spiral-wound grid as a negative grid.

12. The VRLA battery of claim 1, wherein the non-conductive case comprises surface texturing selected from the group consisting of scales, striations, and fins.

13. The VRLA battery of claim 1, wherein the stacked cells are assembled into batteries that are arranged in a side-by-side configuration.

14. A valve regulated lead-acid (VRLA) energy storage cell for a VRLA battery, the energy storage cell comprising a non-conductive case, a spiral wound positive grid plate, a spiral wound negative grid plate, each of the positive and negative plates having a first edge and a second edge on a side opposite the first edge and parallel with a spiral winding direction wherein each of a plurality of tabs is connected to only the first edge of the positive and negative grid plates, spiral wound separator(s) between the plates disposed in the case, the positive and negative grid plates and the separator(s) having a length (L) less than a diameter (D) such that the L/D ratio ranges from about 0.1 to less than about 0.8, a liquid acid electrolyte for energy transfer between the plates, a positive strap and post connected to the positive grid plate, and a negative strap and post attached to the negative grid plate, and wherein the positive and negative posts are disposed through the case and positive and negative terminals are attached to the respective posts for inter-cell connections.

15. The VRLA energy storage cell of claim 14, wherein the cell has a toroidal configuration with an open core for cooling and thermal management thereof.

16. The VRLA energy storage cell of claim 14, wherein the plurality of tabs comprises eight or more electrical tabs for connection to the corresponding positive and negative electrodes.

17. The VRLA energy storage cell of claim 14, wherein the case comprises polypropylene.

18. The VRLA energy storage cell of claim 14, wherein the cell comprises a positive grid plate selected from the group consisting of a pure lead spiral-wound grid plate, a lead-tin spiral-wound grid plate, and a lead-tin-calcium spiral-wound grid plate.

19. The VRLA energy storage cell of claim 14, wherein the cell comprises a copper spiral-wound grid plate as the negative grid plate.

20. The VRLA energy storage cell of claim 14, wherein the non-conductive case comprises surface texturing selected from the group consisting of scales, striations, and fins.

* * * * *